United States Patent [19]

Kugler et al.

[11] Patent Number: 4,743,358
[45] Date of Patent: May 10, 1988

[54] METHOD FOR SUPPRESSING THE HARMFUL EFFECTS OF METAL CONTAMINANTS ON HYDROCARBON CONVERSION CATALYSTS USING A STRONTIUM COLLOID SYSTEM

[75] Inventors: Edwin L. Kugler, Glen Gardner; Richard P. Rhodes, Westfield, both of N.J.

[73] Assignee: Exxon Research and Engineering Company, Florham Park, N.J.

[21] Appl. No.: 940,001

[22] Filed: Dec. 10, 1986

Related U.S. Application Data

[63] Continuation-in-part of Ser. No. 743,593, Jun. 11, 1985, abandoned.

[51] Int. Cl.$^4$ ............................................. C10G 11/00
[52] U.S. Cl. ............................. 208/120; 208/52 CT; 208/113; 208/121; 208/127; 502/29; 502/31; 502/521
[58] Field of Search .............. 208/120, 52 CT, 113, 208/127, 121; 502/29, 31, 521

[56] References Cited

U.S. PATENT DOCUMENTS

| | | | |
|---|---|---|---|
| 3,030,300 | 4/1962 | Flanders et al. | 208/114 |
| 4,002,578 | 1/1977 | Csicsery | 502/64 |
| 4,146,463 | 3/1979 | Radford et al. | 208/120 |
| 4,218,344 | 8/1980 | Vasalos | 502/64 |
| 4,238,362 | 12/1980 | Bertus et al. | 208/52 CT |
| 4,396,496 | 8/1983 | Scharf et al. | 208/113 |
| 4,432,890 | 2/1984 | Beck et al. | 208/120 |
| 4,443,553 | 4/1984 | Chiang et al. | 502/64 |
| 4,483,765 | 11/1984 | Payne | 208/52 CT |
| 4,515,683 | 5/1985 | Beck et al. | 208/113 |

Primary Examiner—Helen M. S. Sneed
Assistant Examiner—Anthony McFarlane
Attorney, Agent, or Firm—Jon W. Ditsler

[57] ABSTRACT

A strontium colloid system is introduced into a hydrocarbon conversion process to suppress the harmful effects of one or more metal contaminants in the hydrocarbon feedstock on the active component(s) of the catalyst used in said process. The strontium compound in the colloid system reacts with or traps the metal contaminants before they contact the active component(s) of said catalyst, thereby reducing catalyst deactivation, coke make and hydrogen production relative to that obtained had said compound been introduced into the process in non-colloid form. In a preferred embodiment, the strontium colloid system is introduced into the reaction zone of said process and, preferably, with at least a portion of the hydrocarbon feedstock to said process.

23 Claims, 7 Drawing Sheets

METHOD FOR SUPPRESSING THE HARMFUL EFFECTS OF METAL CONTAMINANTS ON HYDROCARBON CONVERSION CATALYSTS USING A STRONTIUM COLLOID SYSTEM

CROSS REFERENCE TO RELATED APPLICATIONS

This application is a continuation-in-part of Ser. No. 743,593 filed June 11, 1985 now abandoned.

BACKGROUND OF THE INVENTION

1. Field of the Invention

This invention relates to a method for suppressing the harmful effects of one or more metal contaminants (especially vanadium) on catalysts used in processes that convert higher boiling hydrocarbons to lower boiling fractions. More particularly, this invention relates to the use of a strontium colloid system in catalytic hydrocarbon conversion processes to react with and trap said metal contaminants, thereby resulting in a lower coke make and hydrogen production together with increased activity maintenance of said catalysts.

2. Discussion of Related Art

Today, many modern refineries contain one or more hydrocarbon conversion process (e.g., a fluid catalytic cracking process) in which some of the heavier oils (e.g. gas oils) produced upon fractionation of whole crude oil are converted or "cracked" to lower boiling fractions (e.g. gasoline) in the presence of a suitable catalyst. Usually, oils from light, sweet crudes are preferred feedstocks to most catalytic conversion processes. However, in recent years, the supply of such crudes has diminished, thereby requiring the increasing use of heavier, more sour crudes which contain substantially greater organic metals and metal compounds, such as vanadium and nickel porphyrins. These metal contaminants deposit and accumulate on the catalyst which results in increasing the yield of undesirable hydrogen and coke and decreasing the selectivity of the catalyst to produce desirable liquid products. In addition, vanadium has been found to attack the high activity component(s) of conversion catalysts (e.g. zeolite), thereby causing a decrease in catalyst activity (See for example Ritter et al., "A Look at New FCC Catalysts for Resid", Oil and Gas Journal, July 6, 1981, p. 103). While the mode of vanadium attack is not completely understood, vanadium is believed to migrate through the catalyst particle and accumulate in areas where the high activity component(s) is concentrated. In the case of zeolites, all appear to be susceptible to vanadium attack although the level of susceptibility seems to vary with the type of zeolite and the extent and type of cation exchange.

To counteract the adverse effects of such metal contaminants, various metal additives have been included in hydrocarbon conversion catalysts. Examples of such additives are molecular compounds of antimony (U.S. Pat. Nos. 3,711,422; 4,238,362; 4,279,735; and 4,495,064); bismuth or manganese (U.S. Pat. No. 3,977,963); tin (U.S. Pat. No. 4,101,417 and published European Patent Application No. 0,187,506-A2); barium (U.S. Pat. Nos. 4,377,494 and 4,473,463); calcium (U.S. Pat. Nos. 4,451,355 and 4,520,120); magnesium (U.S. Pat. No. 4,556,478) and lithium (U.S. Pat. No. 4,364,847). Mixtures of various metal additives have also been found to be helpful in reducing the deleterious effects of the metal contaminants. See for example U.S. Pat. No. 4,504,381 (tin and cadmium), U.S. Pat. No. 4,522,704 (cadmium, germanium, indium, tellurium or zinc) and U.S. Pat. No. 4,535,066 (antimony and a composition made by treating a soluble salt of dialkyldithiocarbonate with a hydrolyzable germanium (IV) compound).

Non-colloidal strontium compounds, alone or in combination with other compounds, have also been included in hydrocarbon conversion catalysts and for a variety of reasons. For example, SrO has been used as a component of a catalyst for cracking alkanes (U.S. Pat. No. 4,093,536), as a component of a cracking catalyst support (U.S. Pat. No. 4,382,878) and as a promoter in transition metal oxide Bronsted acid catalysts (U.S. Pat. No. 4,415,480). Non-colloidal strontium compounds (e.g. $SrCO_3$ and $SrSO_4$) have been added to improve the attrition resistance of cracking catalysts as well (see U.S. Pat. Nos. 3,030,300 and 3,265,611). Alkaline earth metal compounds have also been used to remove metal contaminants from hydrocarbon feedstocks (see for example U.S. Pat. Nos. 2,902,442 and 3,617,530), while in U.S. Pat. No. 4,396,496 to Scharf et al., certain non-colloidal strontium compounds (namely strontium oxide, strontium alkyl oxide, strontium aryl oxide and strontium sulfate) have been used with antimony to passivate the metal contaminants and to increase the attrition resistance of the catalyst.

Recently, U.S. Pat. No. 4,432,890 to Beck et al., the disclosure of which is incorporated herein by reference, disclosed the use of a metal additive in a zeolite-containing conversion catalyst to immobilize vanadium compounds present in the hydrocarbon feedstock to a conversion process. The additive prevents the vanadium from attacking the zeolitic component and causing the rapid deactivation of said catalyst. In column 7, lines 45–47, patentees list several possible metal additives, including strontium. Patentees also disclose that the metal additive may be added during catalyst manufacture, after manufacture by impregnation or at any point in the conversion process (see column 1, lines 16–20). When added to the conversion process, "the metal additives are preferably organo-metallic compounds of these metals soluble in the hydrocarbon feed or in a hydrocarbon solvent miscible with the feed." (see column 10, lines 33–36).

Another patent to Beck et al. (U.S. Pat. No. 4,549,958), the disclosure of which is incorporated herein by reference, is related to Beck et al.'s U.S. Pat. No. 4,432,890 patent in that similar metal additives (including strontium) are used to immobilize vanadium. However, in the '958 patent, the immobilization occurs on sorbent particles (preferably dehydrated kaolin clay) treated with the metal additives which circulate through the conversion process along with the zeolite-containing conversion catalyst. The metal contaminants are deposited on the sorbent particles and immobilized thereon upon contact with the metal additive. Suitable additives include the metals, their oxides and salts, and the organo-metallic compounds of the metals listed at column 8, lines 11–14.

Colloids of antimony-containing compounds have also been used to restore the activity of molecular sieve cracking catalysts which have been contaminated with metals such as vanadium and nickel (see, for example, U.S. Pat. No. 4,483,765 to Payne and published European Patent Application No. 0,130,543-A2 to Kaplan). The colloid is typically introduced with the hydrocarbon feedstock, or a portion thereof, to the cracking process. However, colloids containing strontium, while known in the art (see U.S. Pat. No. 3,372,116 to Meinhardt), have not been used in a hydrocarbon conversion process, and specifically not in a catalytic cracking process.

More recently, U.S. application Ser. No. 743,593 to Kugler disclosed a fluid catalytic cracking catalyst containing a zeolite and a particulate, substantially water insoluble non-colloidal strontium compound in an amount effective to mitigate the effects of metal contaminants contained in the hydrocarbon feedstock to the cracking process. However, neither this reference nor any of the other references discussed above, alone or in combination, teach or suggest using a strontium colloid system in a hydrocarbon conversion process for any purpose, much less for trapping and immobilizing metal contaminants present in the feedstock to said process.

SUMMARY OF THE INVENTION

The present invention concerns a method for suppressing the harmful effects of certain metal contaminants (especially vanadium) contained in hydrocarbon feedstocks on catalysts used in hydrocarbon conversion processes. More specifically, this invention relates to contacting a hydrocarbon conversion catalyst with a strontium colloid system in an amount effective to prevent substantial degradation of the active components of said catalyst due to poisoning, destruction or alteration thereof by the metal contaminants present in said feedstock. The strontium compound in the colloid system will react with the metal contaminants to form high melting point compounds which are non-reactive. The introduction of a strontium compound into the process as part of a colloid system results in a reduced hydrogen and coke production and increased activity maintenance and yield of more valuable liquid product relative to that obtained with the same process practiced using a noncolloidal system to introduce the strontium compound.

In a preferred embodiment, the colloid system is introduced into the reaction zone of said hydrocarbon conversion process with at least a portion of the hydrocarbon feedstock to promote efficient contacting of the strontium compound with the catalyst and the metal contaminants in said feedstock.

DETAILED DESCRIPTION OF THE INVENTION

The strontium colloid system of the present invention comprises a strontium compound, a surfactant system, and a liquid hydrocarbon carrier.

As used herein, a strontium compound is meant to include strontium carbonate, the oxides and hydroxides of strontium, or other strontium compounds which would ultimately become carbonates, oxides or hydroxides under process conditions. Strontium carbonate is preferred because of its high reactivity with the metal contaminants and its tendency to form high melting point compounds. Although not necessary for the practice of the present invention, other strontium compounds may be present in said colloid system provided they, like the aforementioned strontium compounds, are substantially insoluble in the hydrocarbon feedstock and substantially unreactive with said feedstock at temperatures associated with the conversion process.

The size of the colloid particle which contains the strontium compound (referred to herein as "strontium colloid") is not critical, but should be sufficient to form a stable colloid dispersion which remains stable when introduced into the conversion process. Accordingly, the size of the strontium colloid can range broadly, say from about 25 Å to about 1000 Å, preferably from about 25 Å to about 100 Å. Colloid size is typically measured by electron microscopy.

A surfactant system comprising one or more surfactants must be used to promote stabilization of the colloid. Suitable classes of surfactants include phenates, carboxylates, sulphonates, phosphates and the like.

The strontium colloid and the surfactant system must also be mixed with a suitable liquid hydrocarbon carrier to facilitate the introduction and dispersion of each into the conversion process. A suitable carrier would be any liquid hydrocarbon that does not cause the colloid to agglomerate nor interfere with the metals trapping reaction or the conversion reaction. The hydrocarbon feedstock to the conversion process would, for example, be a suitable hydrocarbon carrier.

The relative amounts of strontium compound, surfactant and hydrocarbon carrier which comprise the colloid system are not critical and can be determined by one skilled in the art. Typically, however, the amount of strontium compound will range from dilute quantities (e.g. 1% or less) to about 20 wt.% of the colloid system, while the amount of surfactant will range from about 20 wt.% up to about 50 wt.% of the colloid system. The hydrocarbon carrier will usually comprise the balance.

The conditions employed during preparation of the colloid system are also not critical and can vary broadly. For example, the temperature can range between the temperature at which the reaction mixture becomes too viscous to handle easily and the boiling point of the hydrocarbon carrier. Typically, temperatures will range from ambient to about 50° C. Similarly, the pressure used during preparation of the colloid system is not critical. Ambient pressure will normally be employed, except that vacuum may be required to remove any solvents added during colloid preparation.

The solvents serve to solubilize and dilute the surfactant to facilitate its reaction with the strontium compound.

Figure 1:
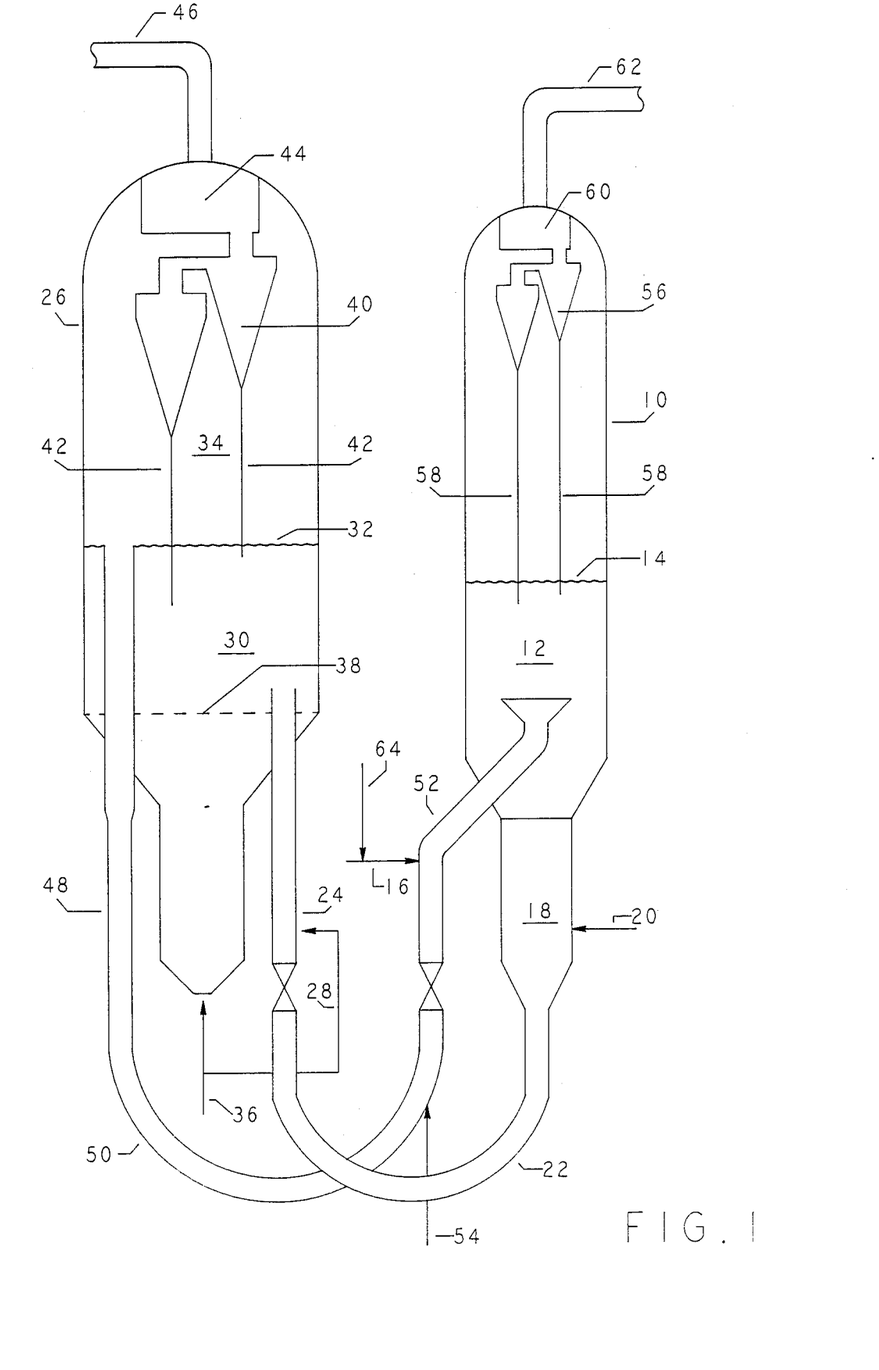
FIG. 1 shows a schematic diagram of how the present invention may be applied to a fluid catalytic cracking process.

Having thus described the strontium colloid system used herein, reference is now made to FIG. 1, which illustrates how said system may be used in one type of hydrocarbon conversion process, a fluid catalytic cracking process. Such details are included as are necessary for a clear understanding of how the colloid system may be applied in said process. However, there is no intention to limit the scope of the present invention to the particular process or configuration shown as other processes and configurations are contemplated. Various items such as valves, pumps, compressors, steam lines, instrumentation and other process equipment and control means have been omitted therefrom for the sake of simplicity. Variations obvious to those having ordinary skill in the art of hydrocarbon conversion processes, specifically fluid catalytic cracking processes, are included within the broad scope of the present invention.

Referring again to FIG. 1, there is shown a vertically arranged cylindrical reaction zone 10 containing a fluidized bed 12 of catalyst having a level indicated at 14, in which a hydrocarbon feedstock introduced at line 16 is undergoing catalytic cracking. Hydrocarbon gas and vapors passing through fluidized bed 12 maintain the bed in a dense, turbulent, fluidized condition.

Suitable hydrocarbon feedstocks include naphthas, light gas oils, heavy gas oils, residual fractions, reduced crude oils, cycle oils derived from any of these, as well as suitable fractions derived from shale oil kerogen, tar sands, bitumen processing, synthetic oils, coal hydrogenation and the like. Such feedstocks may be employed singly, separately in parallel reaction zones, or in any desired combination. Typically, these feedstocks will have an average boiling temperature above 600° F. (316° C.) and will contain metal contaminants such as nickel and vanadium, usually in the form of porphyrins.

In reaction zone 10, the cracking catalyst becomes spent during contact with the hydrocarbon feedstock due to the deposition of coke and said metal contaminants thereon. Thus, the terms "partially coked", "spent" or "coke-contaminated" catalyst as used herein generally refer to catalyst which has passed through a reaction zone and which contains a sufficient quantity of coke thereon to cause activity loss, thereby requiring regeneration. Generally, the coke content of spent catalyst can vary anywhere from about 0.5 to about 5 wt.% or more. Typically, spent catalyst coke contents vary from about 0.5 to about 1.5 wt.%.

Prior to actual regeneration, the spent catalyst is usually passed from reaction zone 10 into a stripping zone 18 and contacted therein with a stripping gas, which is introduced into the lower portion of zone 18 via line 20. The stripping gas, which is usually introduced at a pressure of from about 10 to 50 psig, serves to remove most of the volatile hydrocarbons from the spent catalyst. A preferred stripping gas is steam, although nitrogen, other inert gases or flue gas may be employed. Normally, the stripping zone is maintained at essentially the same temperature as the reaction zone, i.e., from about 450° C. to about 600° C. Stripped spent catalyst from which most of the volatile hydrocarbons have been removed is then passed from the bottom of stripping zone 18 through U-bend 22 and into a connecting vertical riser 24, which extends into the lower portion of a regeneration zone 26. Air is added to riser 24 via line 28 in an amount sufficient to reduce the density of the catalyst flowing therein, thus causing the catalyst to flow upward into regeneration zone 26 by simple hydraulic balance.

In the particular configuration shown, regeneration zone 26 is a separate vessel (arranged at approximately the same level as reaction zone 10) containing a dense phase catalyst bed 30 having a level indicated at 32, which is undergoing regeneration to burn-off coke deposits formed on the catalyst in reaction zone 10 during the cracking reaction, above which is a dilute catalyst phase 34. An oxygen-containing regeneration gas enters the lower portion of regeneration zone 26 via line 36 and passes up through a grid 38 in the dense phase catalyst bed 30, maintaining said bed in a turbulent fluidized condition similar to that present in reaction zone 10. Oxygen-containing regeneration gases which may be employed are those gases which contain molecular oxygen in admixture with a substantial portion of an inert diluent gas. Air is a particularly suitable oxidizing regeneration gas. An additional gas which may be employed is air enriched with oxygen. Additionally, if desired, steam may be added to the dense phase bed along with the regeneration gas or separately therefrom to provide additional inert diluents and/or fluidization gas.

In regeneration zone 26, flue gases formed during regeneration of the spent catalyst pass from the dense phase catalyst bed 30 into the dilute catalyst phase 34 along with entrained catalyst particles. The catalyst particles are separated from the flue gas by a suitable gas-solid separation means 40 and returned to the dense phase catalyst bed 30 via diplegs 42. The substantially catalyst-free flue gas then passes into a plenum chamber 44 and exits regeneration zone 26 through line 46. The regeneration zone is operated for substantially complete combustion of the coke. Temperatures, within regeneration zone 26 can range broadly, say from about 600° C. to about 900° C., but will typically be in the range of from about 670° C. to about 730° C.

Regenerated catalyst from the dense phase catalyst bed 30 in the regeneration zone 26 flows downward through standpipe 48 and passes through U-bend 50 into the reaction zone 10 by way of the transfer line 52, which joins U-bend 50 at the level of the oil injection line 16 above the U-bend. By regenerated catalyst is meant catalyst leaving the regeneration zone which has contacted an oxygen-containing gas causing at least a portion, preferably a substantial portion, of the coke present on the catalyst to be removed. Typically, the carbon content of the regenerated catalyst will range from about 0.01 to about 0.6 wt.%.

Fresh catalyst may be added to the U-bend 50 through line 54 and passed into fluidized bed 12, along with regenerated catalyst and hydrocarbon feedstock. Product vapors containing entrained catalyst particles pass upward through fluidized bed 12 and into a suitable gas-solid separation means 56 wherein entrained catalyst particles are separated therefrom and returned to fluidized bed 12 by diplegs 58. The product vapors are collected in plenum 60 and conveyed to a product recovery system through overhead line 62.

The strontium colloid system may be introduced into a hydrocarbon conversion process at any number of locations. However, as shown in FIG. 1, a preferred location is into the reaction zone of said process and, preferably, by cointroduction through line 64 with the hydrocarbon feedstock at line 16. Cointroduction will facilitate the colloid system being intimately dispersed and mixed with the catalyst and the metal contaminants present in said feedstock. The colloid system may be added continuously or periodically as desired. Alternatively, the catalyst could be treated with the colloid system prior to use of the catalyst in the conversion process.

While not wishing to be bound by any particular theory, applicants believe that the metal contaminants present in a hydrocarbon feedstock have an adverse effect on hydrocarbon conversion catalysts for the reasons described hereinafter. During the conversion reaction, said contaminants are adsorbed onto the first surface of contact, thereby producing an egg-shell type deposit on the exterior surface of the catalyst particles. The contaminants are not mobile in the reaction zone since the metals are in a reduced state. However, when the spent catalyst is passed into the regeneration zone, the metal contaminants are oxidized and become mobile at the elevated temperatures present therein. For example, vanadium pentoxide melts at 670° C., which is below most regeneration zone temperatures, and therefore may migrate during regeneration from its initial exterior position and react with the active component of the catalyst or with other catalyst components. In a catalyst wherein the active component is a zeolite, the zeolite is usually the most reactive component toward the metal contaminant.

However, damage to the active component may be substantially reduced by introducing strontium carbonate into the conversion process. By way of illustration, if the metal contaminant were vanadium which has been oxidized to vanadium pentoxide (e.g. through catalyst regeneration), the vanadium pentoxide (mp=670° C.) would react with the strontium carbonate to form tristrontium vanadate $Sr_3V_2O_8$ (mp=1596° C.), distrontium vanadate $Sr_2V_2O_7$ (mp=1125° C.), and monostrontium vanadate $SrV_2O_6$ (mp=645° C.). The two higher melting forms are produced when the strontium-to-vanadium atomic ratio is equal to or greater than one. The use of excess strontium carbonate converts vanadium pentoxide to the higher melting point di- or tristrontium vanadates. Raising the melting point of vanadium oxide through compound formation limits the mobility of the vanadium such that it does not migrate to the active component (e.g., the zeolite) and can be trapped in a form that will not react with, and hence damage, the catalyst. Using strontium carbonate in less than sufficient quantities may lead to monostrontium vanadate formation, which could lower the melting point of the vanadium compound and fail to reduce its mobility or reactivity. Accordingly, while the atomic ratio of strontium-to-vanadium should be maintained on the catalyst at equal to or greater than one during the conversion process, the atomic ratio will preferably range from about 3 to about 10. Although an atomic ratio greater than 10 could be used, it is likely that no further benefit would be achieved since essentially all of the vanadium would have been reacted. The aforementioned ratios would also be applicable for other suitable strontium compounds as well as for nickel.

With this background in mind, introduction of the strontium colloid system with the hydrocarbon feedstock is preferred because the strontium compound will be intimately dispersed and mixed with the metal contaminants and catalyst particles such that said contaminants and the compound will be deposited together on the surface of said particles. As the catalyst passes from the conversion or reaction zone to the regeneration zone, the metal contaminants will be oxidized and can immediately react with the neighboring strontium compound to prevent migration of the contaminants through the catalyst particle to react with the active component. Accordingly, adding a strontium compound to a conversion catalyst using a colloid system dispersed in the feedstock has two distinct advantages over adding a non-colloidal strontium compound to the catalyst during manufacture.

First, the strontium compound will be concentrated at the location where metal contaminants are deposited on the catalyst. This ensures that a high ratio of strontium-to-vanadium is maintained on the catalyst at the site of the strontium/vanadium reaction. In contrast, a non-colloidal strontium compound added to the catalyst during manufacture will be dispersed throughout the catalyst particles so that very little strontium will be present on the external surface where the metal contaminants deposit initially.

Second, if the catalyst contains a zeolite, adding a strontium compound to the catalyst using a colloid system dispersed in the feedstock prevents ion exchange of the strontium into the zeolite. However, if the strontium compound is added as a catalyst component during manufacture, some of the strontium can dissolve and ion exchange into the zeolite such that a portion of the lanthanide ions is replaced by strontium ions, thereby reducing the hydrothermal stability of the zeolite and making it more susceptible to attack by the metal contaminants. Reduced hydrothermal stability and vanadium resistance by ion exchanging strontium into the zeolite for lanthanide elements means that aqueous impregnation techniques cannot be used to add soluble strontium compounds (e.g., $Sr(OH)_2$, $Sr(NO_3)$, etc.) to the catalyst. An example of reducing catalyst hydrothermal stability by adding strontium carbonate particles to the matrix during catalyst fabrication is provided in Example 3 of U.S. Ser. No. 743,593 to Kugler.

Although the strontium colloid system of the present invention can be used with any catalyst suitable for use in a hydrocarbon conversion process which treats a feedstock containing metal contaminants such as vanadium and nickel, the colloid system is particularly well suited for use with catalytic cracking catalysts. Such catalysts are usually composed of a zeolitic material and a matrix comprising binders and fillers. The zeolitic material provides activity to crack large molecules (i.e. heavier feedstocks) to smaller molecules (i.e. lighter feedstocks), while the matrix provides the activity to crack molecules too large for the zeolite. The matrix also supplies the mass and physical properties for proper fluidization and attrition resistance within a catalytic-cracking process.

The zeolitic material used in cracking catalysts is typically an aluminosilicate zeolite. Zeolites are characterized as crystalline, three dimensional structures of silicon and aluminum which are linked together through shared oxygen atoms. The structure formed is microporous and usually contains uniform cavities connected by similarly uniform channels. The generalized formula may be represented as follows:

where M is a metal cation, n is the valence of that metal, x is between 0 and 1, and y is the number of waters. M may be an alkali metal, alkaline earth metal, hydrogen or ammonium ion, or a lanthanide series element. Good cracking activity usually requires reduction of the alkali metal content to as low as possible; often less than 0.5 wt.%. In a typical catalyst, M will be one or more of lanthanum, cerium, neodymium, or praesodymium.

The zeolite material will have an effective pore size of greater than about 5 Å diameter usually, however, less than 15 Å. Naturally occurring zeolites which may be suitable include gmelinite, faujasite, cancrinite, offretite, mordenite or similar materials. Suitable synthetic zeolites include X, Y, L, beta, many of the ZSM series and omega. Obviously, zeolitic materials may be aluminosilicates, per se, or those structures with phosphorus, gallium, boron or germanium introduced into the framework. The preferred materials are faujasite, Type Y and, "ultrastable" or high silica Type Y.

The zeolitic material (usually after ion exchange to reduce alkali metal content and to incorporate an appropriate cation, e.g., lanthanide ions) is incorporated in a catalyst matrix material. The matrix may include one or more natural mineral clays such as kaolin, halloysite, or montmorillonite and one or more inorganic oxides such as amorphous inorganic oxides, e.g., silica, alumina, silica-alumina, silica-zirconia, silica-magnesia, alumina-boria, alumina-titania, and the like, and mixtures thereof. The inorganic oxide may be introduced in a gel or other suitable form. Silicon and aluminum compounds may also be used as binders to combine the various components of the catalyst.

Although the use of a strontium colloid system has been described in FIG. 1 with respect to a fluid catalytic conversion process, the system may be suitably employed to trap metal contaminants in a catalytic hydrocarbon conversion process of nearly any configuration or design so long as the process has a regeneration zone in which coke deposited on the catalyst during the conversion reaction can be oxidatively removed. Accordingly, other hydrocarbon conversion processes include non-fluidized catalytic cracking processes and catalytic fluid coking processes, both of which are known in the art. Use of the colloid system will also allow the processing of feedstocks which contain significantly higher concentrations of vanadium, nickel, or iron relative to that found in feedstocks normally employed in catalytic hydrocarbon conversion processes. For example, feedstocks containing up to 10 wppm vanadium and higher can be used with no significant reduction in effective catalyst life when compared with conventional cracking processes.

The present invention will be further understood by reference to the following examples which are not intended to limit the scope of the claims appended hereto.

EXAMPLE 1

Strontium Carbonate Is the Most Effective Vanadium Trapping Agent

As disclosed by Kugler in U.S. Ser. No. 743,593, various metal vanadates were formed from vanadium pentoxide and other metal oxides and carbonates by preparing stoichiometric mixtures and then heating the mixtures for two hours in air at 700° C. The resulting products were cooled and examined for compound formation by x-ray powder diffraction. The reactions are listed below:

$$MO + V_2O_5 \rightarrow MV_2O_6$$

$$2MO + V_2O_5 \rightarrow M_2V_2O_7$$

$$3MO + V_2O_5 \rightarrow M_3V_2O_8$$

$$MCO_3 + V_2O_5 \rightarrow MV_2O_6 + CO_2$$

$$2MCO_3 + V_2O_5 \rightarrow M_2V_2O_7 + 2CO_2$$

$$3MCO_3 + V_2O_5 \rightarrow M_3V_2O_8 + 3CO_2$$

where
M = Mg, Ca, Sr, Ba, Zn, Cd.

All of the monometal and dimetal vanadates were formed from stoichiometric mixtures at temperatures typical of the regeneration zone of a fluid catalytic cracking process. The trimetal vanadates did not form as easily. Tri-magnesium vanadate did not form at all, while tri-barium vanadate formed cleanly. The other Group II metals provided mixtures of $M_2V_2O_7$ and $M_3V_2O_8$.

The relative reactivities of the Group II metals were evaluated with a competitive reaction experiment to determine whether the trapping compound or the zeolite had greater reactivity with vanadium. The zeolite, trapping agent and vanadium pentoxide were mixed together prior to being heated for two hours in air at 700° C. The zeolite comprised 50% of the mixture, while the remaining 50% was trapping agent and vanadium pentoxide. The Group II metal-to-vanadium atomic ratio was maintained at 2.0. The starting material and final product were compared using x-ray powder diffraction line intensities to determine the percentage crystallinity that remained after thermal treatment. The results are summarized in Table 1 below.

TABLE 1

| Vanadium Trapping Effectiveness of Group II Metals | |
|---|---|
| Trapping Agent | % Zeolite Crystallinity |
| MgO | 0 |
| CaO | 20 |
| SrCO₃ | 50 |
| BaCO₃ | 0 |
| ZnO | 40 |
| CdO | 5 |

Of the alkaline earth elements, no crystallinity was retained with magnesium oxide or barium carbonate trapping agents. Strontium carbonate showed the most favorable results with 50% crystallinity retention. Calcium oxide showed some crystallinity retention but not as much as the strontium. Of the Group IIb elements, zinc oxide showed the best results with 40% crystallinity retention, but would be unsuitable for use in a catalytic cracking process since zinc oxide, when added to cracking catalysts, was found to produce increased hydrogen and coke. Cadmium oxide showed limited effectiveness with 5% zeolite intensity remaining after thermal treatment.

Accordingly, this example shows that strontium carbonate is the most effective agent among Group II metal compounds for trapping vanadium.

EXAMPLE 2

Preparation of a Strontium Carbonate Colloid System

A 30 gallon stirred glass lined reactor was charged with 17 lbs. of Sr(OH)₂, 8.65 lbs. of Wayfos M60 obtained from Olin Chemical Company and 21.1 lbs. of dodecyclphenol (surfactants), and 13.9 lbs. of a 450°/650° F. heating oil. Methanol (26.3 lbs.) and toluene (105.4 lbs.) were also added as solvents to solubilize and dilute the surfactants so each could react with the strontium compound.

The mixture was then heated to 32° C. and stirred overnight at 150 RPM and ambient pressure. The next morning the agitator speed was increased to 250 RPM and the mixture heated to 106° C. and distilled at that temperature to remove water from the mixture. The distillation was continued for about 3 hours until clear toluene, free of water azeotrope, was obtained. A nitrogen sparge was added to the mixture during distillation to assist in the water removal step.

While continuing to be stirred at 250 RPM, the reactor was cooled externally to 60° C. and an additional 26.3 lbs. of methanol and 32 lbs. of toluene were added to replace the solvent removed during the prior drying step. The resulting mixture was soaked overnight at 41° C. to ensure complete reaction of the surfactant and the strontium compounds.

A total of 7.25 lbs. of $CO_2$ was then bubbled into the bottom of the stirred reactor over 2.5 hours at 40° C. to convert the strontium compounds to strontium carbonate colloid. 50 lbs. of the 450°/650° F. heating oil were added and the resulting mixture heated for 2.5 hours to a final temperature of 130° C. and 96 KPa vacuum to remove the solvents. The additional heating oil served to replace the solvents removed and to prevent instability of the reaction mixture.

The resulting mixture was filtered through a precoated Sparkler filter at 130° C. to produce 99.6 lbs. of a strontium carbonate colloid system having the following inspections:
Total Base No.: 129
Sr, wt.%: 10.1
Flash Point, °C.: 126
Viscosity, cst. at 100° C.: 15.5
Density at 60° F., gm/ml: 0.85
Sediment, Vol.%: 0.01.

EXAMPLE 3

Catalyst Performance on Hydrocarbon Feedstock Without Metal Contaminants

Figure 2A:
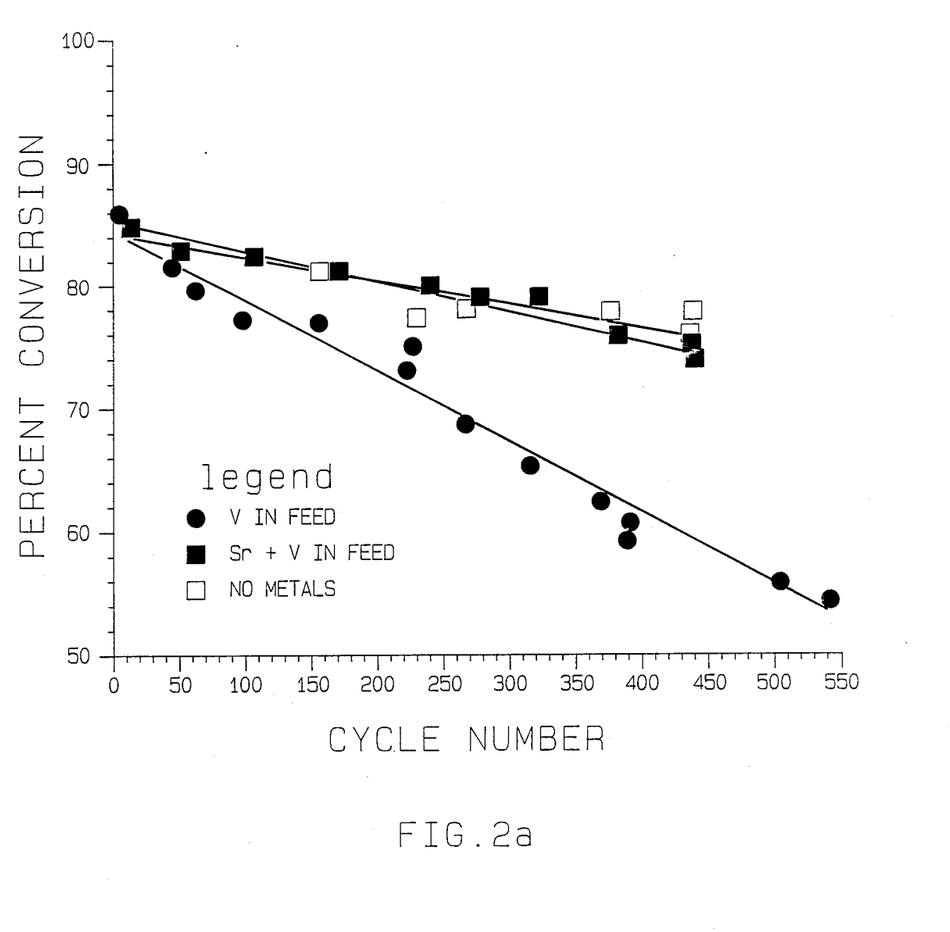
FIG. 2a shows that higher conversion through improved activity maintenance is obtained when a strontium colloid system is used in a fluid catalytic cracking pilot unit test.

An artificial feedstock comprising 1.48 gm of a mixture containing 9 parts gas oil and 1 part toluene (by weight) was fed over a period of 75 seconds to a reactor containing 4.0 gm of calcined (2 hr, 540° C.) DA-400, a zeolitic cracking catalyst obtained from Davison Chemical Company. The gas oil was a catalytic cracking cycle stock having a boiling point range of 400° to 875° F. The catalyst was in the form of an expanded bed (such expansion provided by flowing nitrogen) at a temperature of 485±5° C. During feed addition and for several minutes thereafter, liquid and gaseous products were collected. The catalyst was then regenerated at 760±5° C. in an atmosphere containing air, steam, and nitrogen. After cooling to 485±5° C., feedstock was again added, and the catalyst again regenerated. This cyclic mode of operation, that is, cycling between oil feed and regeneration, was continued for more than 300 such cycles. Periodically, the liquid and gas products from selected cycles were analyzed and catalyst activity and hydrogen production determined. The catalyst activity expressed as weight percent conversion was calculated based on the disappearance of hydrocarbon feedstock boiling above 421° F. The fraction of both the feedstock and liquid product boiling above 421° F. was determined by gas chromatographic simulated distillation, following ASTM Method D2887-73. The conversion of feedstock as a function of cycle number is shown in FIG. 2a by the open squares. Each cycle runs 25 minutes so that every 50 cycles in the figure represents approximately one day of operation. With no metals in the feed, the catalyst activity as measured by conversion is shown to decrease slowly with increasing cycle number due to hydrothermal aging. The slope of a line through the data is a measure of the activity maintenance of the catalyst.

Figure 2B:
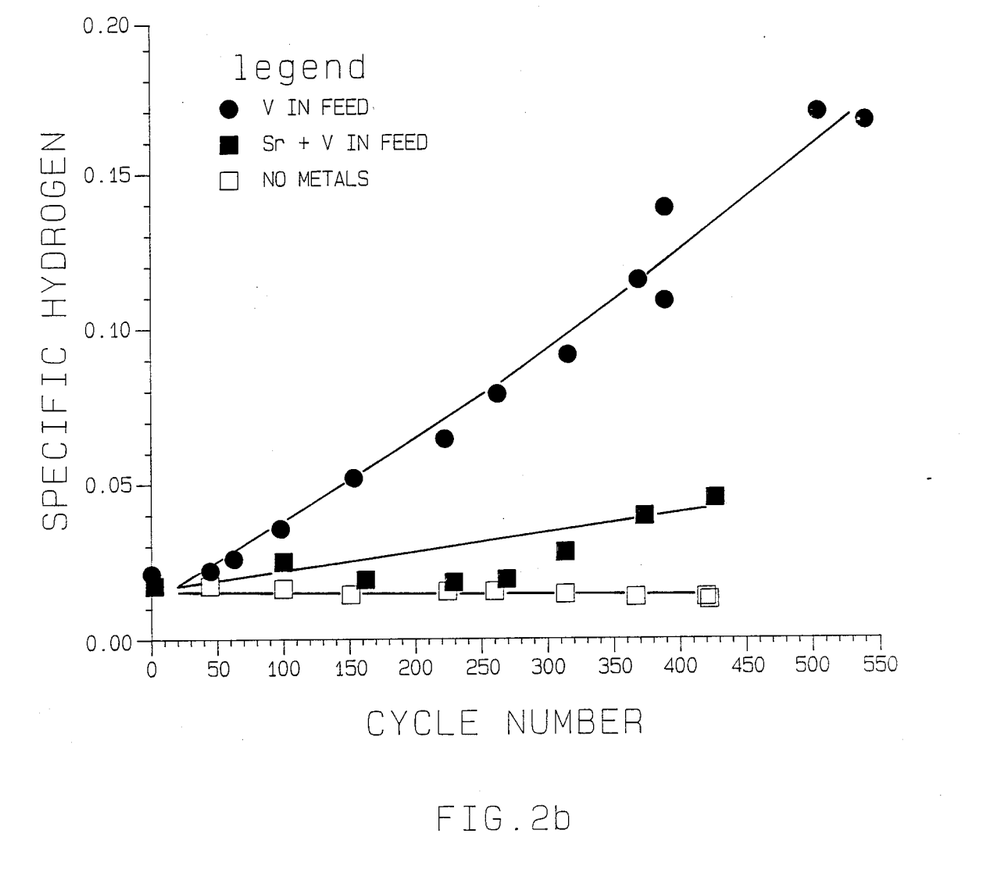
FIG. 2b shows that hydrogen production is reduced when a strontium colloid system is used in a fluid catalytic cracking pilot unit test.

The hydrogen produced during the cracking reaction was collected with the product gases and analyzed by gas chromatography. The hydrogen yield was initially calculated as a weight percent based on fresh feed. The specific hydrogen is defined as the hydrogen yield divided by $(X/100-X)$ where X is the weight percent conversion. The specific hydrogen as a function of cycle number is shown in FIG. 2b by the open squares. As shown therein, with no metals in the feed, the specific hydrogen remains nearly constant with increasing cycle number.

EXAMPLE 4

Vanadium Has Deleterious Effect on Catalyst Performance

The procedure followed in this example was identical to that used in Example 3 except that the feedstock also contained 40 wppm vanadium (added as a vanadyl porphyrin). The results of this experiment are shown by the solid circles in FIGS. 2a and 2b.

FIG. 2a shows that the activity of the catalyst decreased substantially with cycle number when vanadium was present in the feed. The vanadium also caused an increase in the hydrogen production as shown in FIG. 2b.

EXAMPLE 5

Strontium Carbonate Colloid System Improves Catalyst Performance

The procedure followed in this example was identical to that used in Example 3 except that the feedstock also contained 40 wppm vanadium (added as a vanadyl porphyrin) and 510 wppm of the strontium carbonate colloid system formed in Example 2. The results of this experiment are shown by the solid squares in FIGS. 2a and 2b.

FIG. 2a shows that the activity maintenance of the catalyst was substantially improved when the strontium carbonate colloid system was included in the metals-containing feedstock. The catalyst conversion dropped slowly with increasing cycle number, similar to the deactivation observed with no metals, and substantially improved over the deactivation shown for the feedstock containing 40 wppm vanadium without the strontium carbonate colloid system.

The production of hydrogen shown in FIG. 2b was significantly reduced when the strontium carbonate colloid system was added to the metals containing feedstock. As shown therein, specific hydrogen increases very slowly when the strontium and vanadium deposit on the catalyst from the feedstock.

EXAMPLE 6

Strontium Carbonate Colloid Is More Effective than Calcium Carbonate Colloid

The procedure followed in this example is identical to that used in Example 3 except that the feedstock contained 230 wppm calcium (added as a calcium carbonate colloid, Shell Chemical Co. AC-60C) and 40 wppm vanadium (added as a vanadyl porphyrin). Since calcium has a lower atomic weight than strontium, the 230 wppm calcium is the molar equivalent of the 510 wppm strontium concentration used in Example 4.

Figure 3A:
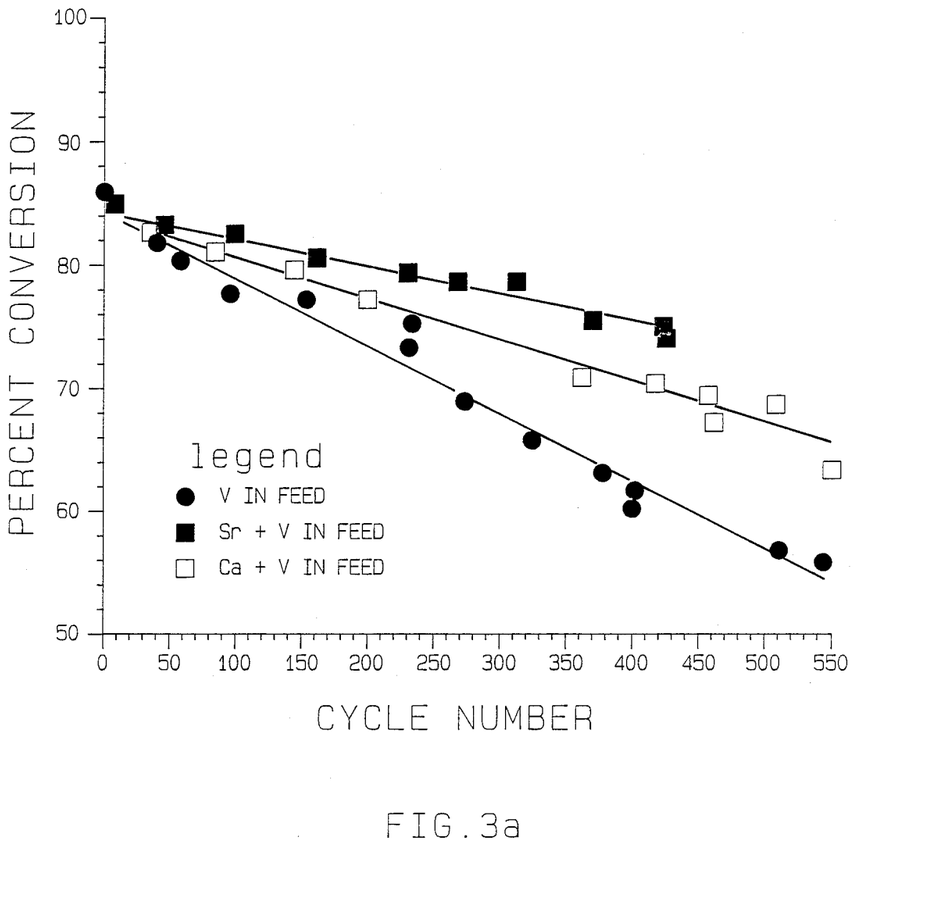
FIG. 3a shows that higher conversion through improved activity maintenance is obtained in a fluid catalytic cracking pilot unit test when a strontium colloid system is used rather than a calcium colloid system.

The effect of calcium carbonate colloids on activity maintenance with 40 wppm vanadium in the feedstock is shown by the open squares in FIG. 3a. The calcium data is bracketed from above by the solid squares for the strontium colloid system with vanadium (Example 4) and from below by the solid circles of vanadium alone in the feedstock (Example 5). FIG. 3a clearly shows that the strontium colloid system is more effective than the calcium colloid system for maintaining conversion as vanadium accumulates on the catalyst surface.

Figure 3B:
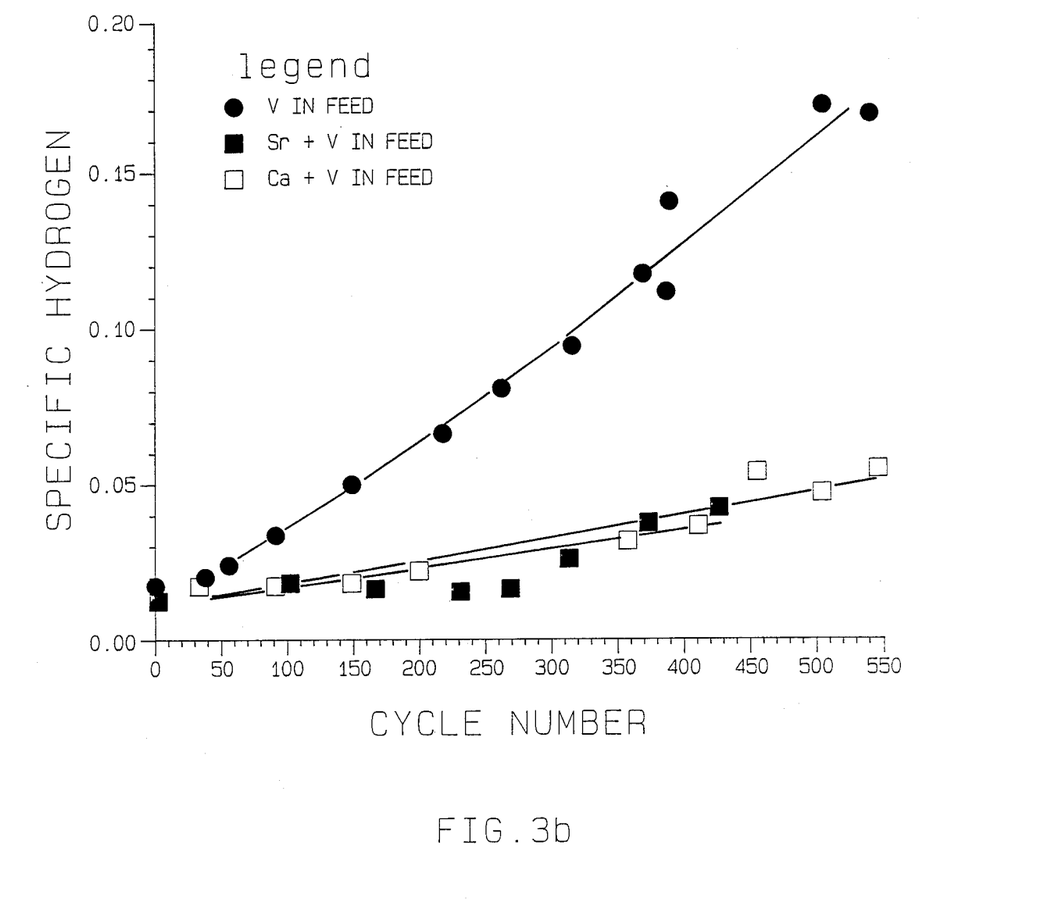
FIG. 3b shows that a strontium colloid system is effective in reducing hydrogen production.

The effect of calcium carbonate colloids on the hydrogen selectivity is shown by the open squares in FIG. 3b. Again the solid squares are for strontium carbonate colloids and the solid circles are for 40 wppm vanadium alone. The hydrogen production as a function of cycle number is very similar for both the strontium and calcium carbonate colloid systems. Both calcium and strontium have similar effects in reducing hydrogen production as vanadium accumulates on the catalyst.

EXAMPLE 7

Strontium Colloid Preferred to Non-Colloidal Form of Strontium Compound

The procedure of Example 3 was followed in this example except that the feedstock contained 510 wppm strontium (added as a strontium naphthenate, Pfaltz and Bauer SO9690) and 40 wppm vanadium (added as a vanadyl porphyrin). The results of this experiment are shown by the open squares in FIGS. 4a and 4b.

Figure 4A:
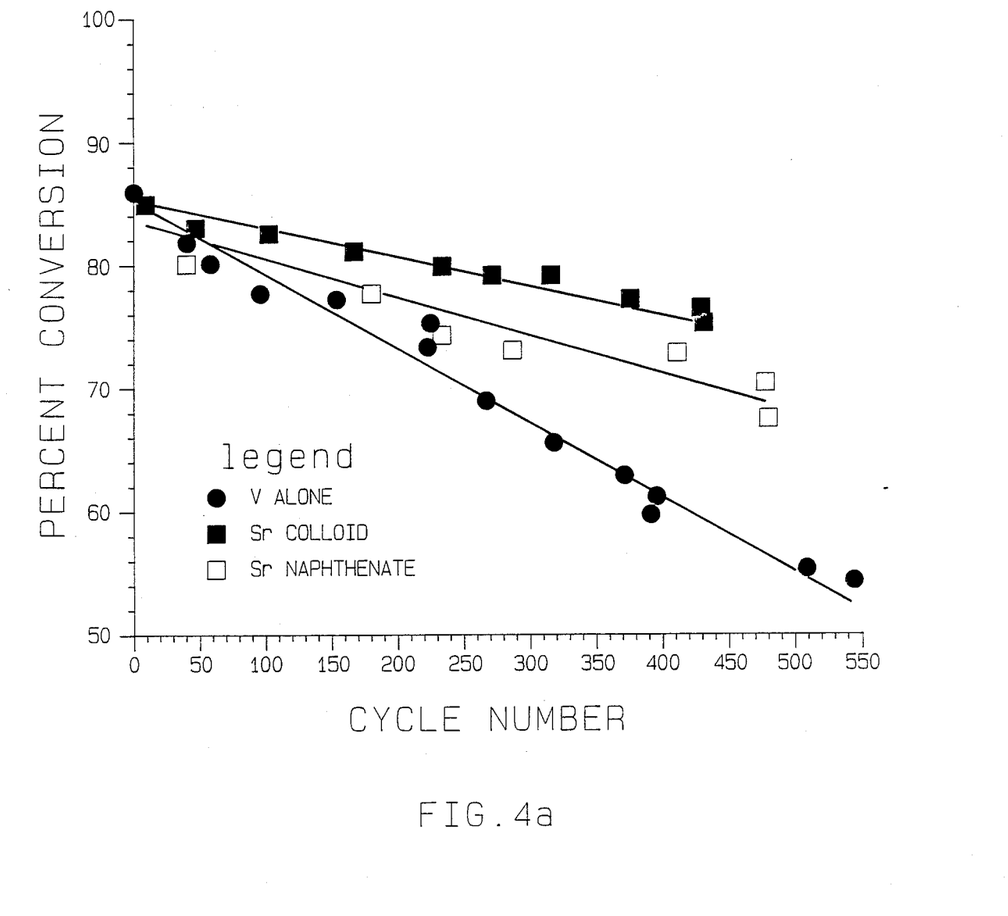
FIG. 4a shows that higher conversion through improved activity maintenance is obtained in a fluid catalytic cracking pilot unit test when a strontium colloid system is used rather than strontium in non-colloid form.

In FIG. 4a, the open squares show the activity maintenance of strontium naphthenate with 40 wppm vanadium in the feedstock. This data is bracketed from above by the solid squares for the strontium colloid system with vanadium (Example 4) and from below by the solid circles for vanadium alone in the feedstock (Example 5). FIG. 4a clearly shows that the strontium colloid system is more effective than the strontium naphthenate organo-metallic compound for maintaining conversion as vanadium accumulates on the catalyst surface.

Figure 4B:
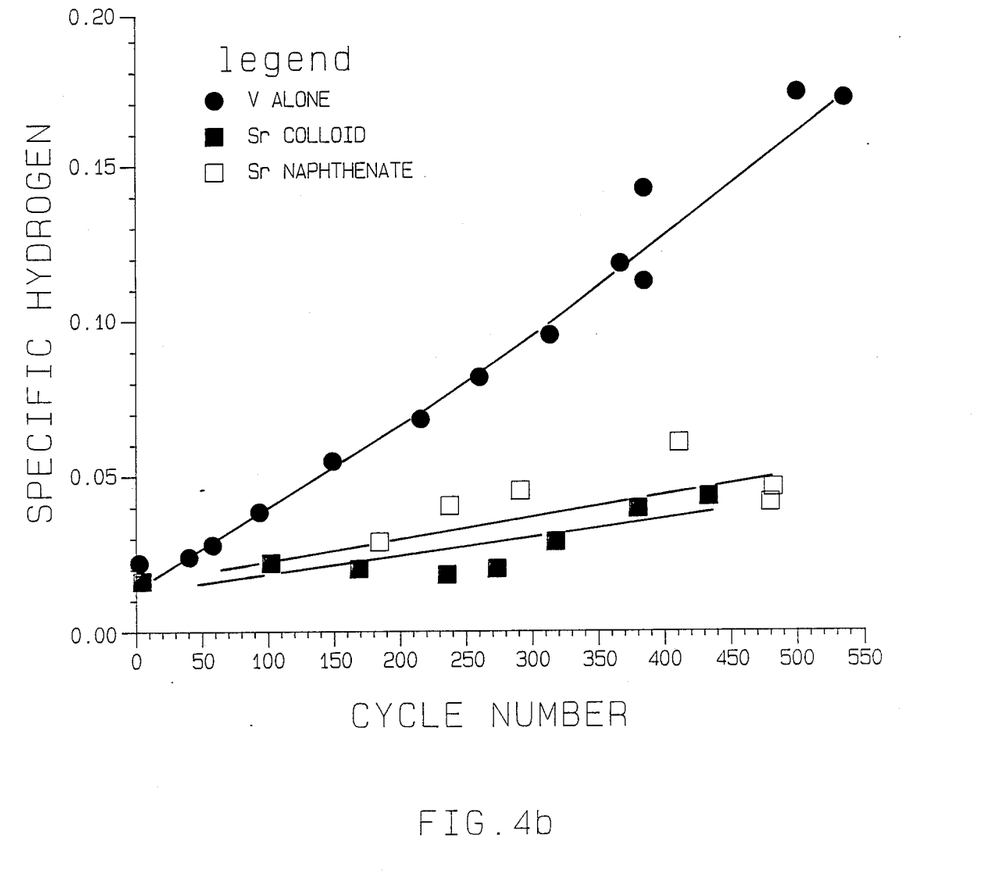
FIG. 4b shows that hydrogen production is reduced in a fluid catalytic cracking pilot unit test when a strontium colloid system is used rather than strontium in non-colloid form.

The effect of strontium naphthenate on hydrogen production is shown by the open squares in FIG. 4b. Again the solid squares are for the strontium colloid system with vanadium and the solid circles are for 40 wppm vanadium alone. The hydrogen production as a function of cycle number is similar for both the strontium naphthenate and strontium colloid system at the end of the experiment. However, the colloid system was more effective at reducing hydrogen production during the middle of the run. Both the strontium naphthenate organo-metallic compound and the strontium colloid system substantially reduced the amount of hydrogen produced by vanadium alone.

What is claimed is:

1. In a catalytic hydrocarbon conversion process in which a hydrocarbon feedstock having an average boiling temperature above 316° C. and containing one or more metal contaminants is contacted with a conversion catalyst in a reaction zone at a temperature between about 450° C. and about 600° C. wherein at least a portion of said feedstock is converted to lower boiling hydrocarbon products and coke contaminated catalyst is formed on which at least a portion of said metal contaminants has been deposited, wherein said coke contaminated catalyst is regenerated in a regeneration zone under regeneration conditions by contact with an oxygen-containing regeneration gas thereby forming a regenerated catalyst, and wherein a non-colloidal strontium compound is introduced into said process to react with and suppress the deleterious effects of said metal contaminants on said regenerated catalyst, the improvement which comprises introducing into said process a strontium colloid system comprising a strontium compound in an amount sufficient to obtain enhanced activity maintenance of said regenerated catalyst and increased conversion of said feedstock to liquid hydrocarbon products relative to that obtained if said strontium compound had been introduced as a non-colloidal strontium compound.

2. The process of claim 1 wherein said metal contaminants are vanadium, nickel or mixtures thereof.

3. The process of claim 1 wherein said metal contaminant comprises vanadium.

4. The process of claim 2 or 3 wherein said colloid system is introduced into said process with at least a portion of said hydrocarbon feedstock.

5. The process of claim 2 or 3 wherein said strontium colloid system comprises a strontium compound in an amount such that the atomic ratio of strontium-to-vanadium maintained on the catalyst during said process is at least one.

6. The process of claim 1 wherein said colloid system comprises (1) a strontium compound in an amount up to about 20%, (2) surfactant ranging from about 20% to about 50%, and a hydrocarbon carrier, based on weight percent of the colloid system.

7. The process of claim 1 wherein said conversion catalyst contains a zeolite.

8. The process of claim 1 wherein said hydrocarbon conversion process is a catalytic fluid coking process.

9. The process of claim 1 wherein said strontium colloid system comprises strontium carbonate.

10. In a fluid catalytic cracking process in which a hydrocarbon feedstock containing one or more metal contaminants is contacted with a zeolite-containing cracking catalyst in a reaction zone under cracking conditions to form liquid hydrocarbon products and coke contaminated catalyst on which at least a portion of said metal contaminants has been deposited, wherein said coke contaminated catalyst is regenerated in a regeneration zone under regeneration conditions by contact with an oxygen-containing regeneration gas so as to form a regenerated catalyst, and wherein a non-colloidal strontium compound is introduced into said process to react with and suppress the deleterious effects of said metal contaminants on said regenerated catalyst, the improvement which comprises introducing into said process a strontium colloid system comprising a strontium compound in an amount sufficient to obtain enhanced activity maintenance of said regenerated catalyst and increased conversion of said feedstock to liquid hydrocarbon products relative to that obtained if said strontium compound had been introduced as a non-colloidal strontium compound.

11. The process of claim 10 wherein said metal contaminants are vanadium, nickel or mixtures thereof.

12. The process of claim 10 wherein said metal contaminant comprises vanadium.

13. The process of claim 11 or 12 wherein said colloid system is introduced into said process with at least a portion of said hydrocarbon feedstock.

14. The process of claim 13 wherein said colloid system is introduced into the reaction zone of said process.

15. The process of claim 11 or 12 wherein said strontium colloid system comprises a strontium compound in an amount such that the atomic ratio of strontium-to-vanadium maintained on the catalyst during said process is between about 3 and about 10.

16. The process of claim 10 wherein said colloid system comprises (1) a strontium compound in an amount from about 1% to about 20%, (2) surfactant ranging from about 20% to about 50%, and a hydrocarbon carrier, based upon weight percent of the colloid system.

17. The process of claim 10 or 12 wherein said hydrocarbon feedstock contains at least 10 wppm metal contaminants.

18. The process of claim 10 wherein said strontium colloid system comprises strontium carbonate.

19. In a fluid catalytic cracking process in which a hydrocarbon feedstock containing vanadium is contacted with a zeolite-containing cracking catalyst in a reaction zone under cracking conditions to form liquid hydrocarbon products and coke contaminated catalyst on which at least a portion of said vanadium has been deposited, wherein said coke contaminated catalyst is regenerated in a regeneration zone under regeneration conditions by contact with an oxygen-containing regeneration gas thereby forming a regenerated catalyst, and wherein non-colloid strontium carbonate is introduced into said process to react with and suppress the deleterious effects of vanadium on said regenerated catalyst, the improvement which comprises introducing into said reaction zone a colloid system comprising strontium carbonate in mixture with at least a portion of said hydrocarbon feedstock, the amount of said strontium carbonate being sufficient to obtain enhanced activity maintenance of said regenerated catalyst and increased conversion of said feedstock to liquid hydrocarbon products relative to that obtained if said strontium carbonate had been introduced as non-colloid strontium carbonate.

20. The process of claim 19 wherein strontium carbonate is present in said colloid system in an amount such that the atomic ratio of strontium-to-vanadium maintained on the catalyst during said process is between about 3 and about 10.

21. The process of claims 19 or 20 wherein said colloid system comprises strontium carbonate in an amount from about 1% to about 20%, surfactant ranging from about 20% to about 50% and a hydrocarbon carrier, based upon weight percent of the colloid system.

22. The process of claim 19 or 20 wherein said hydrocarbon feedstock contains at least 10 wppm vanadium.

23. The process of claim 19 wherein said cracking catalyst is coated with said colloid system prior to use of said catalyst in said process.

* * * * *